United States Patent [19]
Tsay et al.

[11] Patent Number: 5,297,909
[45] Date of Patent: Mar. 29, 1994

[54] SELF-DRILLING EXPANSION SCREW

[76] Inventors: Leu-Wen Tsay, 2nd. Fl., No. 10, 11th Alley, Lane 59, Mu-Cha Rd.; Fu-Liang Lang, 7-3, Lane 2, Ching-Feng St.; Yu-Lung Luo, 154, Shih-Ta Rd., all of Taipei, Taiwan

[21] Appl. No.: 45,185

[22] Filed: Apr. 13, 1993

[51] Int. Cl.5 .................. F16B 13/04; F16B 13/06
[52] U.S. Cl. .......................... 411/29; 411/51; 411/54
[58] Field of Search ............. 411/29, 30, 31, 51, 411/54, 55

[56] References Cited

U.S. PATENT DOCUMENTS

| | | | |
|---|---|---|---|
| 1,342,201 | 6/1920 | Beckwith | 411/29 |
| 1,449,625 | 3/1923 | Phillips | 411/29 |
| 3,935,786 | 2/1976 | Murray et al. | 411/29 |
| 4,575,294 | 3/1986 | Mermi et al. | 411/54 X |
| 4,990,042 | 2/1991 | Szayer et al. | 411/29 |

FOREIGN PATENT DOCUMENTS 457045  7/1968  Switzerland ............ 411/29

*Primary Examiner*—Neill R. Wilson
*Attorney, Agent, or Firm*—Michael D. Bednarek

[57] ABSTRACT

A self-drilling expansion screw capable of being driven by a screw driving means comprises: (a) a screw shank having a first end and a second end, including: (1) an expansion hole extending a distance along the axis of the screw shank from the first end toward the second end; (2) a slot located on the expansion hole, for communicating the expansion hole with the outer periphery of the screw shank; (3) a holding portion, formed by a plurality of strip grooves provided at the outer periphery of the screw shank with respect to the expansion hole; and (4) a screw threaded portion provided between the second end and the holding portion; (b) a nut member screwed from the screw threaded portion; (c) a taper head having a coarse end and a small end, the small end inserted into the expansion hole, the holding portion expanding outwards while the taper head is pushed into the expansion hole; (d) a drilling bit provided at the coarse end; and (e) a coupling portion provided at the second end of the screw shank, for engaging with a screw driving tool so as to drive the drilling bit to rotate around the axis of the screw shank. By the way, the self-drilling expansion screw is able to be used for drilling, fastening, or fixing.

4 Claims, 4 Drawing Sheets

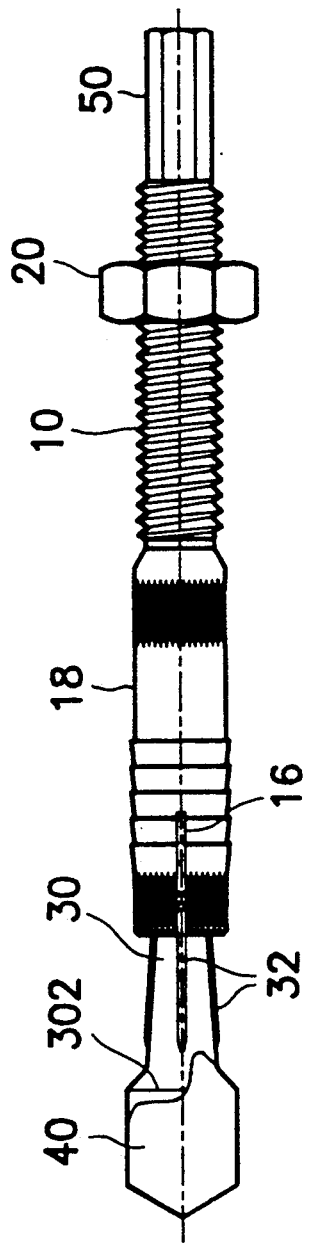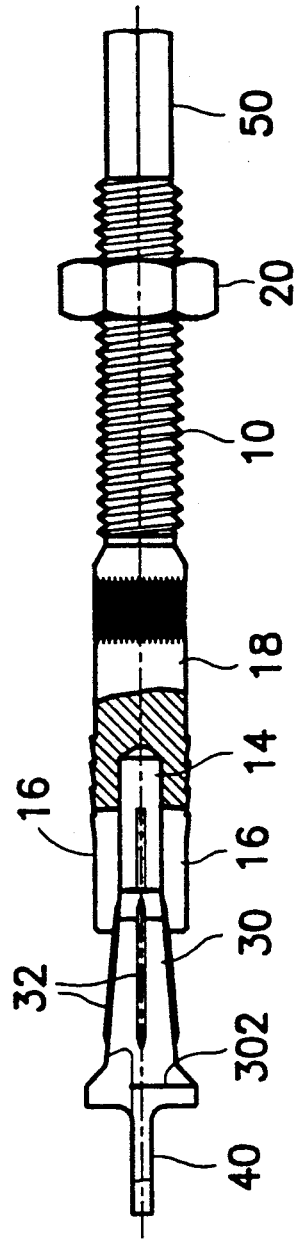
FIG. 3
FIG. 4

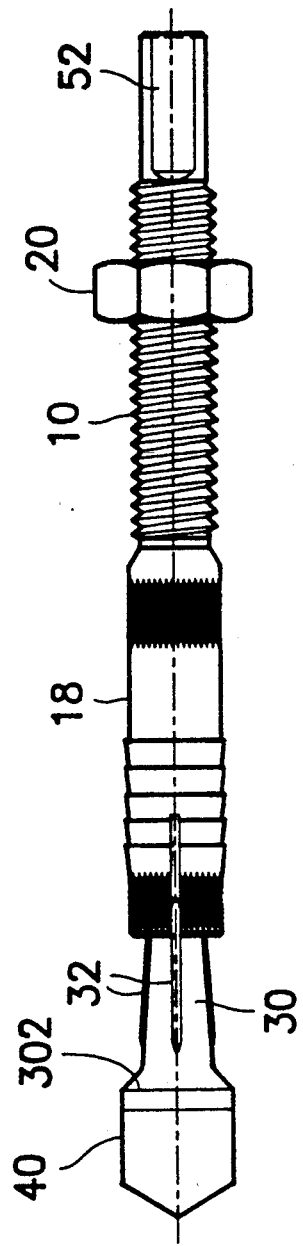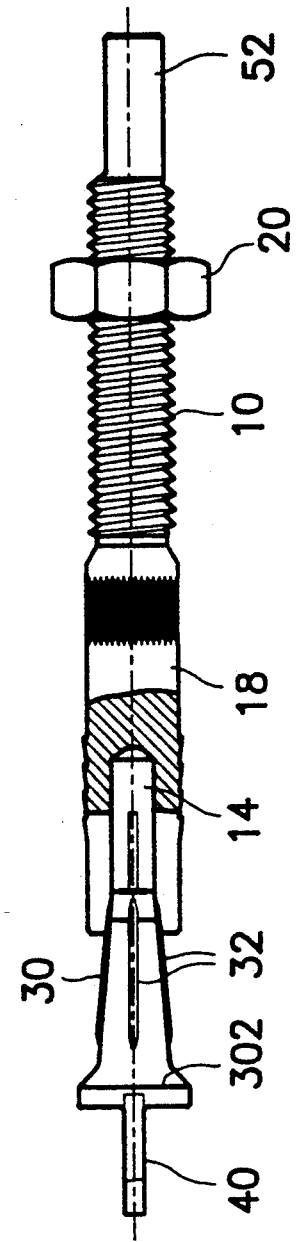
FIG. 5
FIG. 6

SELF-DRILLING EXPANSION SCREW

FIELD OF THE INVENTION

The present invention relates to a self-drilling expansion screw, particularly to a self-drilling expansion screw provided with a hardened drilling bit and a coupling portion for engaging with a screw driving means during drilling, fastening, or fixing.

BACKGROUND OF THE INVENTION

Referring to FIG. 1 and FIG. 2, FIG. 1 is a front view of a conventional expansion screw, and FIG. 2 is a partial sectional view of the expansion screw shown in FIG. 1. The expansion screw shown in FIG. 1 and FIG. 2 comprises a screw shank 10, a nut member 20, and a taper head 30. The screw shank 10 having a first end and a second end includes: an expansion hole 14 shown in FIG. 2, which extends a distance along the axis of the screw shank 10 from the first end toward the second end; a slot 16 located on the expansion hole 14, for communicating the expansion hole 14 with the outer periphery of the screw shank 10; a holding portion 18, formed by a plurality of strip grooves 182 provided at the outer periphery of the screw shank 10 with respect to the expansion hole 14; and a screw threaded portion provided between the second end of the screw shank 10 and the holding portion 18, and having continuous threads around the outer periphery thereof. A nut member 20 is screwed onto the screw threaded portion. Additionally, the taper head 30 has a coarse end 302 and a small end 304, the small end 304 is inserted into the expansion hole 14. The holding portion 18 will expand outwards while the taper head 30 is pushed into the expansion hole 14.

In order to anchor the conventional expansion screw described hereinbefore in a concrete construction, rock, or stone, a hole which is fitted for the expansion screw has to be drilled first, and then it is inserted into the drilled hole, by the way of hitting or hammering. The taper head 30 is forced to urge against the expansion hole 14 and make the holding portion 18 be expanded. The conventional expansion screw thus can be anchored in the desired location. However, it is not always easy for a user to drill a hole with an optimum size for the expansion screw. Furthermore, a user has to drill a hole first, then insert the expansion screw and hit the end of the screw shank to anchor the expansion screw.

SUMMARY OF THE INVENTION

Accordingly, it is an object of the present invention to provide a self-drilling expansion screw for solving the problems indicated above, which comprises:

a screw shank having a first end and a second end, including: an expansion hole extending a distance along the axis of the screw shank from the first end toward the second end; a slot located on the expansion hole, for communicating the expansion hole with the outer periphery of the screw shank; a holding portion, formed by a plurality of strip grooves provided at the outer periphery of the screw shank with respect to the expansion hole; and a screw threaded portion provided between the second end and the holding portion, and having continuous threads around the outer periphery thereof;

a nut member screwed from the screw threaded portion;

a taper head having a coarse end and a small end, the small end inserted into the expansion hole, the holding portion expanding outwards while the taper head is pushed into the expansion hole;

a drilling bit provided at the coarse end; and a coupling portion provided at the second end for engaging with a screw driving tool so as to drive the self-drilling expansion screw to rotate around the axis of the screw shank.

Additionally, the coupling portion can be manufactured into the form of any shapes, such as hexagon, square, or cap. Moreover, there are a series of anti-torsion wings at the outer periphery along the axis of the taper head so as to offer the supporting stress during drilling.

According to the self-drilling expansion screw of the present invention, it is capable of being used for drilling, fastening, or fixing.

DESCRIPTION OF THE DRAWINGS

The present invention may be better understood with reference to the drawings of preferred embodiments of the present invention.

FIG. 3 is a front view of the first embodiment of the self-drilling expansion screw according to the present invention;

FIG. 4 is a partial sectional view of the self-drilling expansion screw shown in FIG. 3;

FIG. 5 is a front view of the second embodiment of the self-drilling expansion screw according to the present invention;

FIG. 6 is a partial sectional view of the self-drilling expansion screw shown in FIG. 5;

The numerals are the same for corresponding parts in the drawings.

DESCRIPTION OF THE PREFERRED EMBODIMENTS

Figure 1:
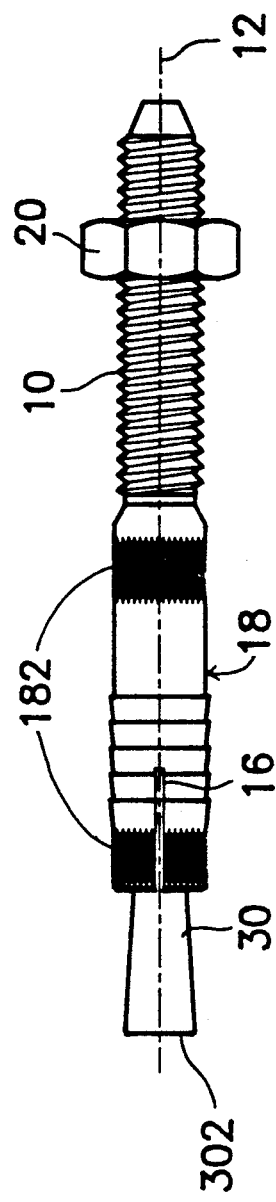
FIG. 1 is a front view of a conventional expansion screw.
Figure 2:
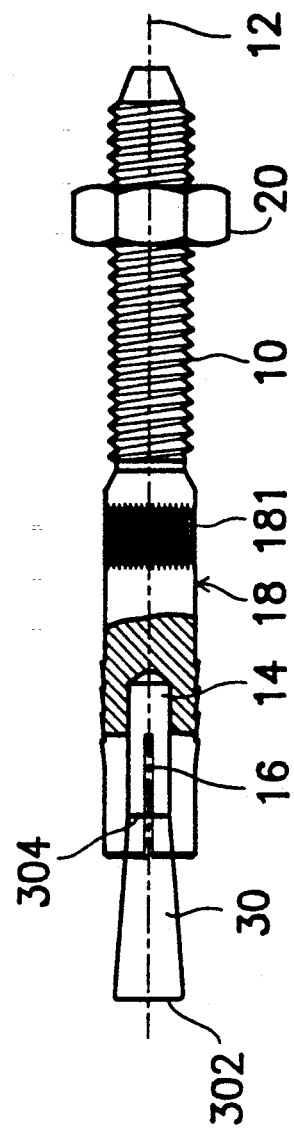
FIG. 2 is a partial sectional view of the expansion screw shown in FIG. 1.
Figure 7:
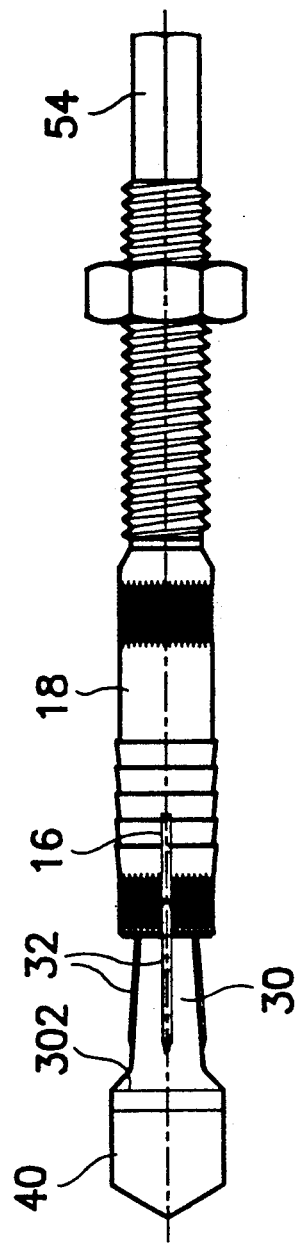
FIG. 7 is a front view of the third embodiment of the self-drillIng expansion screw according to the present invention.
Figure 8:
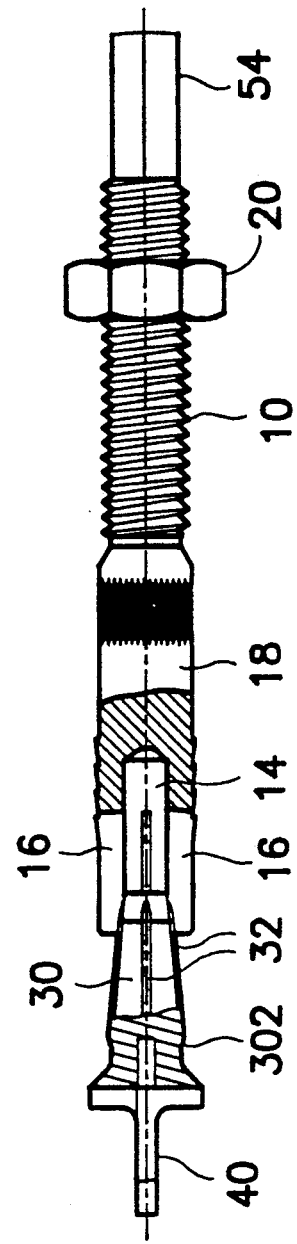
FIG. 8 is a partial sectional view of the self-drilling expansion screw shown in FIG. 7.

With reference to FIG. 3 and FIG. 4, the same parts in FIG. 1 through FIG. 4 have the same numerals for clarity of explanation. The major difference between the self-drilling expansion screw according to the present invention and the conventional expansion screw is that there is a hardened drilling bit 40 adjacent to the coarse end 302 of the taper head 30 (i.e. the left side shown in FIG. 3 and FIG. 4), and the screw shank 10 (i.e. the right side shown in FIG. 3 and FIG. 4) is provided with a coupling portion for engaging with screw driving means such as an electrical drill. The coupling portion can take the form of any cross-section shapes, such as a hexagon (number 50 as shown in FIG. 3 and FIG. 4), round with a flat side (number 52 as shown in FIG. 5 and FIG. 6), square (number 54 as shown in FIG. 7 and FIG. 8), or others. Thus, the hardened drilling bit 40 can be driven by the screw driving means. Furthermore, there are a series of anti-torsion wings 32 at the outer periphery along the axis of the taper head 30 so as to lock the taper head to the screw shank and offer support to the taper head during the drilling process.

Additionally, the taper head 30 of the self-drilling expansion screw of the present invention has a hardened drilling bit 40 for drilling, and there are a series of anti-torsion wings for providing enough supporting stress during drilling. After drilling to the required depth, the coupling portion (50, 52, 54) of the self-drilling expansion screw of the present invention is hammered so that the taper head 30 is forced to urge against the expansion hole 14, and make the holding portion 18 be expanded by the slot 16 so that the self-drilling expansion screw may be fixed in the required position. Because the end of the screw shank 10 can be manufactured into the form of any cross-section shapes, such as a hexagon (shown in FIG. 3 and FIG. 4), round with a flat side (shown in FIG. 5 and FIG. 6), or square (shown in FIG. 7 and FIG. 8), it is very convenient to engage with a socket of a rotating tool during drilling, fastening, or fixing.

Moreover, the hardened drilling bit 40 of the self-drilling expansion screw of the present invention may be manufactured from carbon steel or alloy steel, and can be hardened by heat treatment so as to insure the drilling bit 40 is hard enough to cut through concrete, stones, or rocks, while the heat treatment process may be: induction hardening, flame hardening, gas or salt-bath hardening, carburizing, or nitriding treatment, etc. Because higher hardness should be observed for the drilling bit only, the joining of various materials can be undertaken. The drilling bit can be the material of a cutting tool with higher hardness originally or it can be hardened by heat treatment initially. Then, the drilling bit 40 is attached to the taper head 30 by way of welding or other processes. The welding processes can be: gas welding, TIG welding, plasma-arc welding, resistance welding, friction welding, laser beam welding, or brazing, etc. FIG. 5 and FIG. 6 show a drilling bit 40 attached to the taper head 30 by a welding process, and FIG. 7 and FIG. 8 show a drilling bit 40 attached to the taper head 30 by a screw fastening process. The screw shank 10 of the self-drilling expansion screw of the present invention may be manufactured from carbon steel, alloy steel, or austenitic stainless steel. To increase the anti-corrosion ability of the screw 10, it is preferable to be manufactured from stainless steel. While the screw shank 10 and the taper head 30 are manufactured from austenitic stainless steel, the self-drilling expansion screw of the present invention can be used in some corrosion environments so as to greatly improve the anti-corrosion ability of the present expansion screw.

As described above, according to the self-drilling expansion screw of the present invention, the coupling portion provided at one end of the self-drilling expansion screw of the present invention is capable of coupling with a driving means so as to drive the tool part provided at the other end thereof, thus the self-drilling expansion screw can be used for drilling, fastening, or fixing.

Although the present invention has been disclosed hereinbefore by way of preferred embodiments, it should be understood that various changes or modifications are still possible by those skilled in the art without departing from the spirit and scope of the present invention. The protection scope of the present should be regarded as claims described hereinafter.

What is claimed is:

1. A self-drilling expansion screw capable of being driven by a screw driving means, comprising:
   (a) a screw shank having a first end and a second end, including:
      (1) an expansion hole extending a distance along the axis of said screw shank from said first end toward said second end;
      (2) a slot located on said expansion hole, for communicating said expansion hole with the outer periphery of said screw shank;
      (3) a holding portion, formed by a plurality of strip grooves provided at the outer periphery of said screw shank with respect to said expansion hole; and
      (4) a screw threaded portion provided between said second end and said holding portion, and having continuous threads around the outer periphery thereof;
   (b) a nut member screwed onto said screw threaded portion;
   (c) a taper head having a coarse end and a small end, said small end inserted into said expansion hole, said holding portion expanding outwards while said taper head is pushed into said expansion hole;
   (d) a drilling bit provided at said coarse end; and
   (e) a coupling portion provided at said second end, for engaging with a screw driving tool so as to drive said self-drilling expansion screw to rotate around the axis of said screw shank;
   wherein there are a series of anti-torsion wings at the outer periphery along the axis of said taper head for locking the taper head to said screw shank and supporting taper head.

2. The self-drilling expansion screw as claimed in claim 1, wherein a cross-section of said coupling portion is manufactured into a hexagon shape.

3. The self-drilling expansion screw as claimed in claim 1, wherein a cross-section of said coupling portion is manufactured into a square shape.

4. The self-drilling expansion screw as claimed in claim 1, wherein a cross-section of said coupling portion is manufactured into a round shape with a flat side.

* * * * *